United States Patent
Bertolini

(10) Patent No.: US 9,182,197 B2
(45) Date of Patent: Nov. 10, 2015

(54) PANE CONSTRUCTION AND CORRESPONDING BULLET PROOF WINDOW

(71) Applicant: ISOCLIMA S.P.A., Este (IT)

(72) Inventor: Alberto Bertolini, Este (IT)

(73) Assignee: ISOCLIMA S.P.A., Este (IT)

( * ) Notice: Subject to any disclaimer, the term of this patent is extended or adjusted under 35 U.S.C. 154(b) by 0 days.

(21) Appl. No.: 13/897,835

(22) Filed: May 20, 2013

(65) Prior Publication Data
US 2013/0312594 A1    Nov. 28, 2013

(30) Foreign Application Priority Data
May 21, 2012    (EP) .................................... 12003952

(51) Int. Cl.
| F41H 7/00 | (2006.01) |
|---|---|
| B60J 1/00 | (2006.01) |
| B60J 11/00 | (2006.01) |
| F41H 5/26 | (2006.01) |
| F41H 5/04 | (2006.01) |
| B32B 17/10 | (2006.01) |

(52) U.S. Cl.
CPC ............ *F41H 7/00* (2013.01); *B32B 17/10018* (2013.01); *B32B 17/10036* (2013.01); *B32B 17/1077* (2013.01); *B32B 17/10119* (2013.01); *B32B 17/10761* (2013.01); *B60J 11/00* (2013.01); *F41H 5/0407* (2013.01); *F41H 5/0414* (2013.01); *F41H 5/0442* (2013.01); *F41H 5/263* (2013.01)

(58) Field of Classification Search
CPC ....... F41H 5/0407; F41H 5/263; B32B 17/06; B32B 17/10; B32B 17/10018; B60J 1/004; B60J 1/007; B60J 1/02; B60J 1/085; B60J 11/00

USPC .................. 296/84.1, 146.15, 187.07, 190.1; 89/36.01, 36.02, 36.04, 36.08, 36.09; 52/783.1, 785.12, 786.11, 786.12, 52/796.1; 428/911
See application file for complete search history.

(56) References Cited

U.S. PATENT DOCUMENTS

| 3,061,490 | A | * | 10/1962 | Ryan ............................... 428/81 |
|---|---|---|---|---|
| 4,284,677 | A | * | 8/1981 | Herliczek ..................... 428/192 |
| 4,316,404 | A | * | 2/1982 | Medlin ......................... 89/36.08 |
| 4,336,644 | A | * | 6/1982 | Medlin ......................... 29/401.1 |
| 5,002,820 | A | * | 3/1991 | Bolton et al. ................. 428/215 |
| 5,117,587 | A | * | 6/1992 | Doan ........................... 49/495.1 |
| 5,487,323 | A | * | 1/1996 | Madden, Jr. ................. 89/36.08 |
| 5,594,193 | A | * | 1/1997 | Sheridan ...................... 89/36.08 |
| 6,495,261 | B1 | * | 12/2002 | Gagliardi et al. ............. 428/426 |
| 6,565,980 | B1 | * | 5/2003 | Ackermann ............... 428/425.6 |
| 7,191,694 | B1 | | 3/2007 | Gonzalez |
| 2004/0058125 | A1 | * | 3/2004 | Gonzalez ...................... 428/122 |
| 2011/0274486 | A1 | * | 11/2011 | White et al. ..................... 404/6 |
| 2012/0133179 | A1 | * | 5/2012 | Baroggi et al. ............... 296/201 |
| 2012/0175908 | A1 | * | 7/2012 | McCarthy et al. ........... 296/84.1 |

FOREIGN PATENT DOCUMENTS

DE    202004007765 U1    9/2005

* cited by examiner

*Primary Examiner* — Jason S Daniels
(74) *Attorney, Agent, or Firm* — Hauptman Ham, LLP

(57) ABSTRACT

The present invention relates to a pane construction or screen for covering and protecting at least a part of the outside of a ballistic block of a bullet proof window. The ballistic window for use in a motor vehicle may comprise the ballistic block having transparent panes and layers made of glass, ceramic, or plastic which are arranged in a layered manner in a laminate, and it has an outside surface which is covered completely or at least in part by the transparent pane construction.

32 Claims, 8 Drawing Sheets

Fig. 9

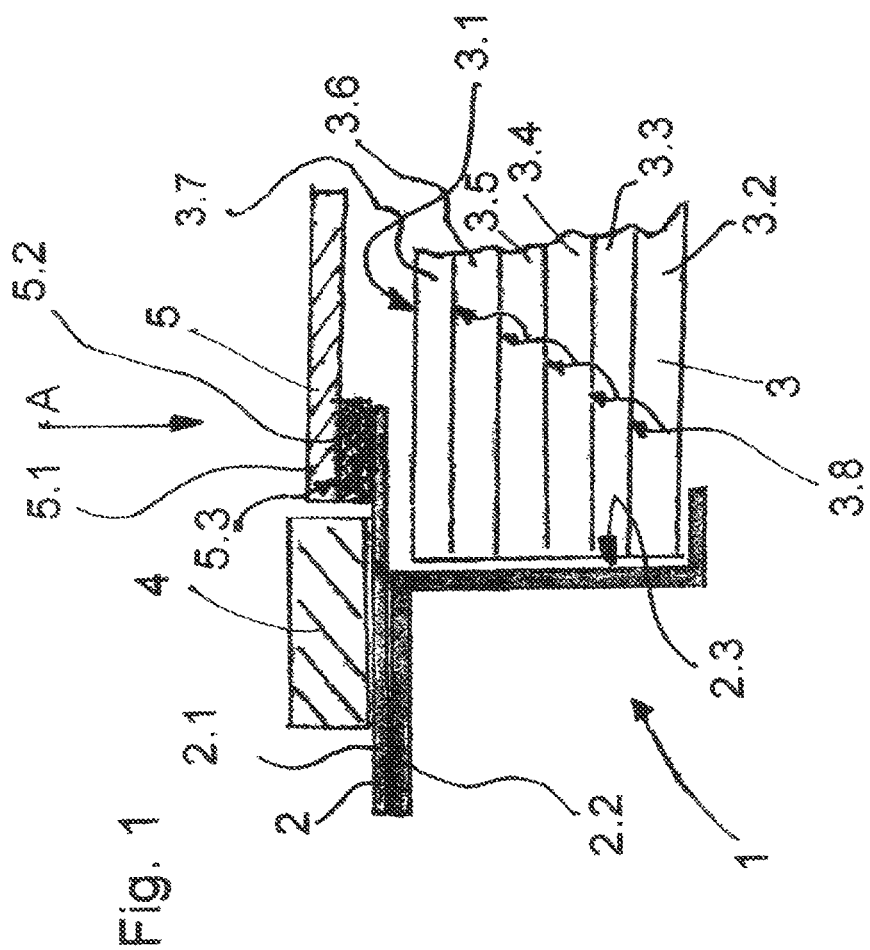

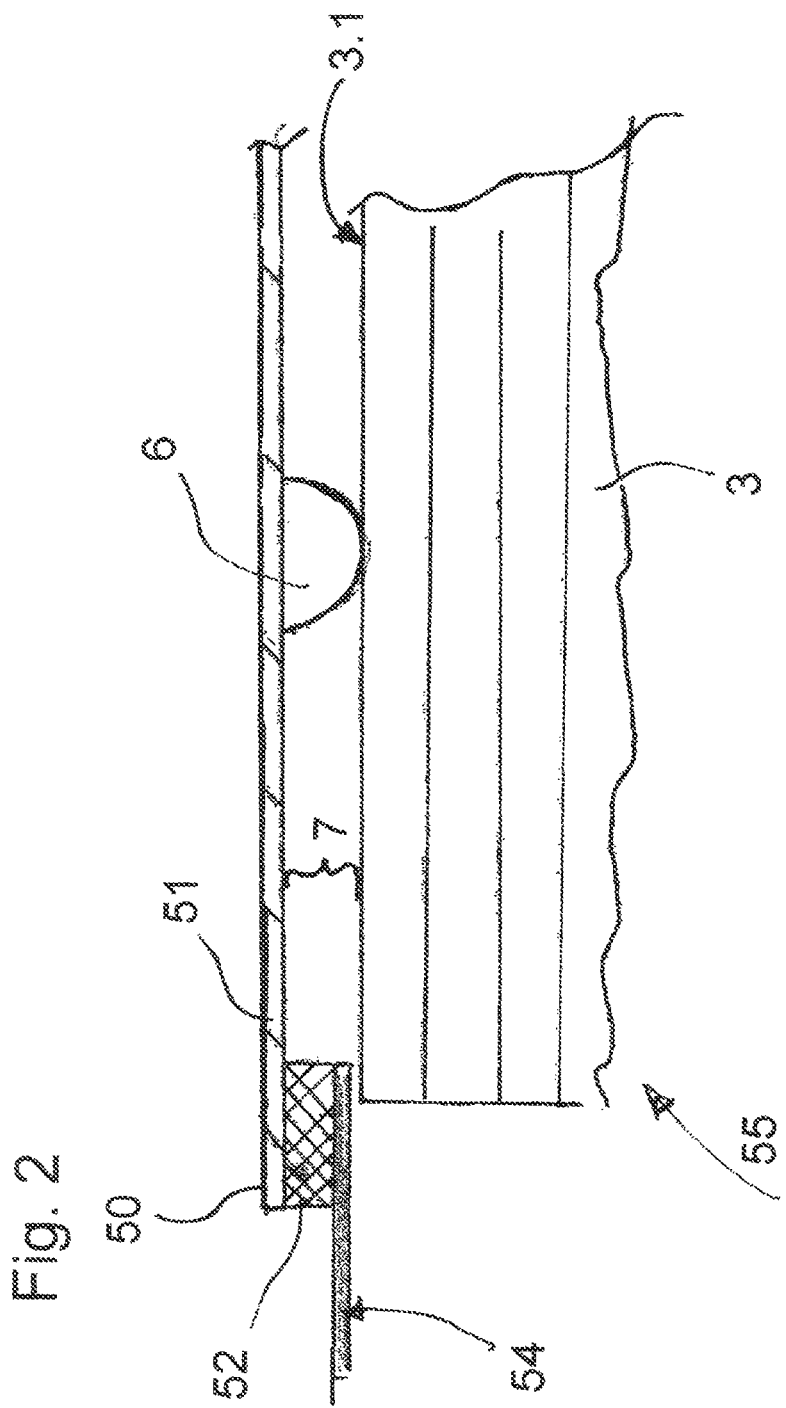

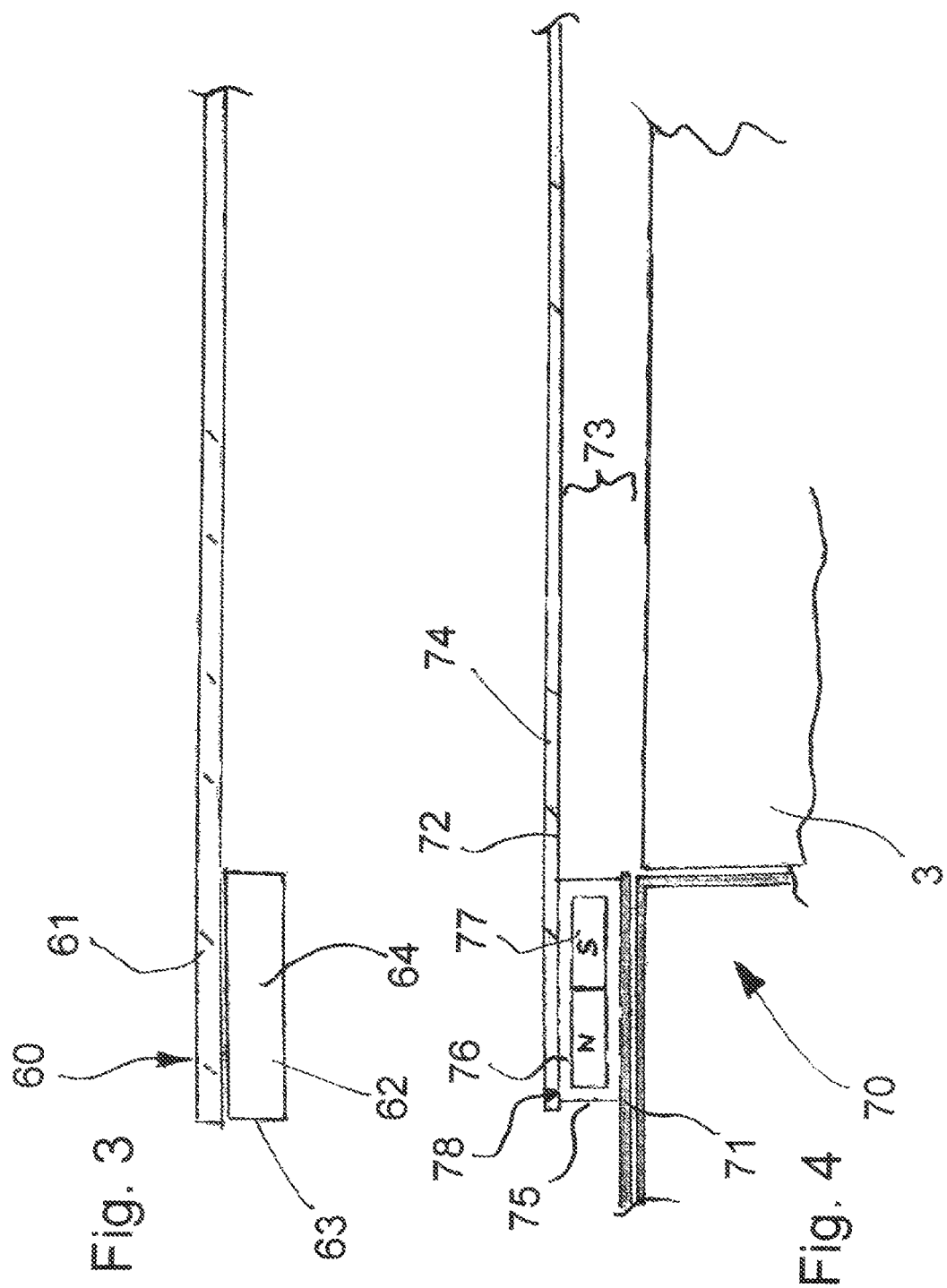

PANE CONSTRUCTION AND CORRESPONDING BULLET PROOF WINDOW

RELATED APPLICATIONS

Figure 5:
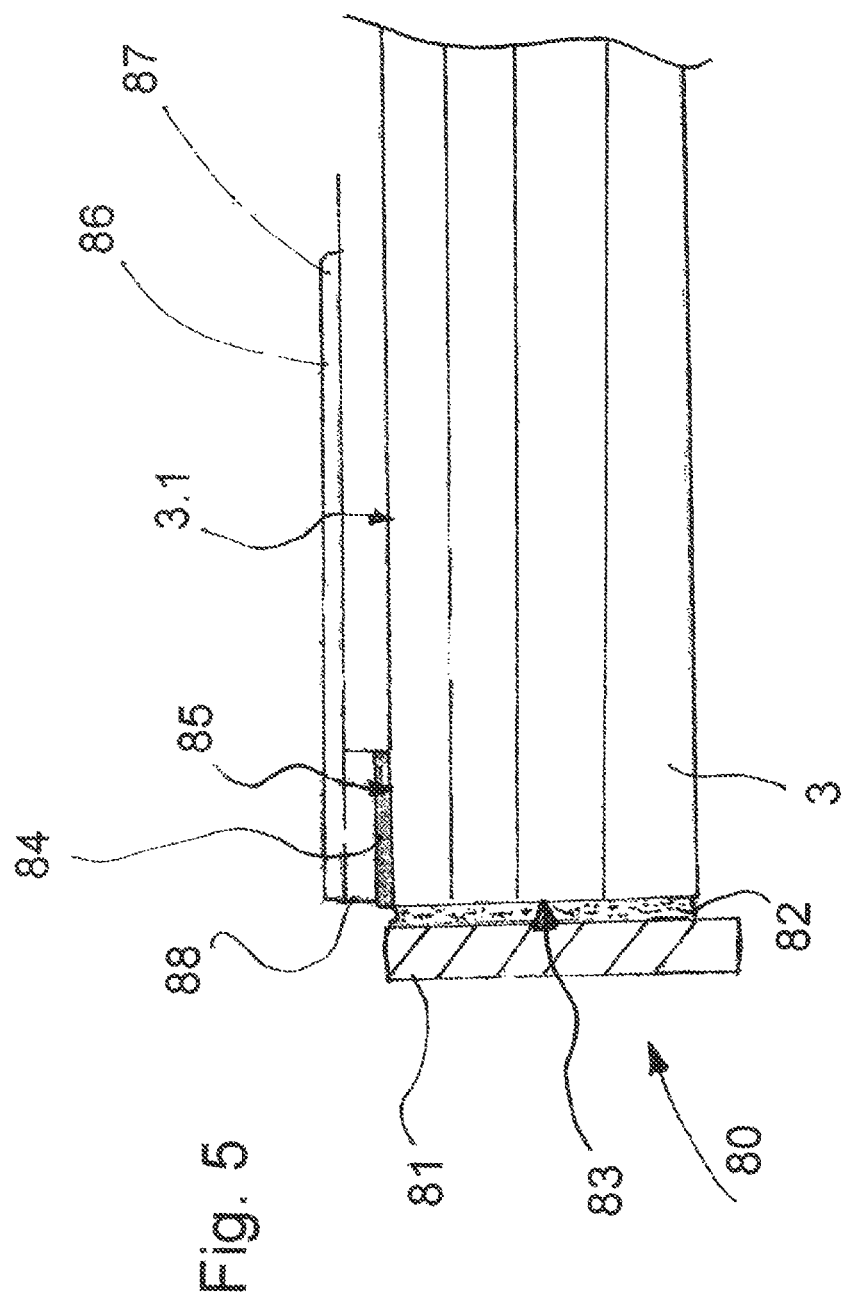

The present application is based on, and claims priority from, European Application Number 12003952.4, filed May 21, 2012, the disclosure of which is hereby incorporated by reference herein in its entirety.

The present invention relates to a pane construction and a corresponding bullet proof and/or shatter proof window for use in a motor vehicle which comprises a ballistic block having transparent panes and layers made of glass, ceramic, or plastic which are arranged in a layered manner in a laminate.

The pane construction and the bullet proof window are used particularly in a motor driven vehicle like a truck, a car, or, for instance, a military vehicle.

Generally bullet proof windows or bullet resistant glazings are in most cases expensive and therefore their breaking, cracking or chipping cause a standstill of the vehicle during which the damaged glazing has to be completely removed and a new bullet proof window has to be installed to maintain the required security and protection of the passengers in the vehicle. Often smaller objects such as stones, marbles, or other small size parts, or also bigger objects like bottles etc. are thrown onto the outer surface of the bullet proof window and in consequence often only the outer glass ply of the bullet proof window is subjected to a certain, often really small damage resulting in cumbersome and time consuming replacement of the whole bullet proof window.

It is therefore an object of the present invention to avoid the replacement of the whole bulletproof window and the standstill of the vehicle due to in most cases small damages of only the outer ply of the bulletproof window.

This object is solved by the pane construction or pane according to claim 1 for covering and protecting at least a part of the outside of an optically transparent ballistic block or of a bullet proof window. Accordingly, the pane construction or screen of the invention has the advantage to cover and protect the outside glass ply or layer of the bullet proof window to avoid small damages of the ballistic block of the bullet proof window. The pane construction of the invention can be applied to the outer ply of the ballistic block with a simple operation and can also be removed and replaced easily in case of small damages or necessary cleaning in short time.

The pane construction of the invention also enables upgrading of consisting bulletproof windows of older vehicles without great work since in many cases it is only required to mount the pane construction in front of the bullet proof windows like side windows, windscreen, or rear window in order to obtain intended protection of the window.

Further, in accordance to a preferred embodiment of the invention, the transparent pane construction of the invention is exchangeable or removable independently of the ballistic block of the bullet proof window to increase the operating time of the vehicle, particularly of a military vehicle, since only the removable pane construction itself has to be replaced and exchanged, but not the heavy ballistic block of the bullet proof window used in this vehicle.

In a preferred embodiment of the invention, a gasket is provided on the pane construction. The gasket helps to create a barrier to prevent penetration of air, dust, and liquids into the space between the pane construction and the outside of the ballistic block of the bullet proof window.

Preferably, the gasket is magnetic for fixing or mounting the pane construction on a metallic frame or steel frame of the bullet proof window or the body of the vehicle only by means of the resulting magnetic attraction forces between the magnetic gasket and the steel frame or body of the vehicle.

The gasket may comprise magnetic powder to create a homogeneous circumferential magnetic force in order to obtain a strong mounting force. In an alternative thereto, the gasket may comprise magnets or a magnetic stripe in or on the gasket to create a strong magnetic adhering force if put on the vehicle.

Preferably, the pane construction of the invention comprises supporting means for supporting the pane construction on the ballistic block of the bullet proof window to avoid unintentional deflection of the inventive pane construction.

Further, the pane construction of the invention may comprise at least one transparent electrically conductive layer or structure to protect the passengers in the vehicle against strong electromagnetic fields due to jamming. The gasket may be electrically conductive to enable a Faraday cage.

The transparent pane construction of the invention may comprise one or more layers made of glass, ceramic or plastic material, which are in a layered manner connected to each other in a laminate. Using a laminate in the pane construction improves the effectiveness of protecting the bullet proof window.

The pane construction of the invention may comprise at least one layer made of Gorilla glass by Corning, polycarbonate (PC), toughened glass or glass, acryl glass, methacrylate, plastic, Sentry glass plus or spall shield film by DuPont. Accordingly, it is possible to design the inventive pane construction for the special requirements given by the bullet proof window.

Preferably, the pane construction, screen, or panel of the invention is a transparent laminate comprising an outer layer made of glass or Gorilla glass, an inner layer made of glass or Gorilla glass, and an intermediate layer between the inner and outer layers made of Sentry glass (SPG), polyvinylbutyral (PVB), polyurethane (PU), polycarbonate (PC), spall shield film, or methacrylate.

The invention also relates to a bullet proof window or ballistic window for use in a motor vehicle according to claim 12 comprising a transparent ballistic block or glass having transparent panes and layers made of glass, ceramic, or plastic which are arranged in a layered manner in a laminate, and having an outside surface, wherein at least one transparent pane construction as mentioned above is provided which covers completely or at least a part of the outside surface of the ballistic block. The bullet proof window of the invention has the advantage that the ballistic block is covered and protected by the pane construction against the damaging effects of small objects thrown at the protected window.

In a preferred embodiment of the invention, the pane construction is arranged with or without a gap or space between the outside surface of the ballistic block and the pane construction to improve, inter alia, the protection of the ballistic block, since a damaging force affecting the inventive pane construction is not transferred to the ballistic block of the bullet proof window.

A peripheral and circumferential gasket may be arranged between the ballistic block, a frame for mounting the ballistic block on a body of the vehicle, and/or a body of the vehicle and the pane construction for mounting the pane construction on the ballistic block, the frame, and/or the body of the vehicle. The gasket assures the tightness between the pane construction and the ballistic block.

Preferably, the bullet proof window comprises a magnetic tape for mounting the pane construction on a gasket wherein the magnetic tape is fixed to an inside surface of the pane construction and/or to an outside surface of the gasket.

The gasket may be fixed on the pane construction by an adhesive or an adhesive tape or the gasket may be fixed to the ballistic block, the frame of the window, or the body of the vehicle by an adhesive or adhesive tape to facilitate an easy mounting of the pane construction on the vehicle or the bullet proof window.

Further, the bulletproof window of the invention may have clamping means for holding the pane construction on the bulletproof window and/or for pressing the pane construction against the gasket to improve the tightness of the gasket.

Further, the bulletproof window may comprise at least one mounting frame or ferromagnetic frame for mounting the pane construction and/or the gasket on the body of the vehicle, the bulletproof window, or the ballistic block. The mounting frame or ferromagnetic mounting frame is provided if the vehicle or bulletproof window does not have a ferromagnetic frame or similar structure for mounting a magnetic pane construction.

Preferably, the bulletproof window of the invention comprises at least one transparent and electrically conductive layer or structure arranged on the pane construction and electrically coupled to a frame and/or body of the vehicle by coupling means for the purpose of anti-jamming protection.

Jamming is initiated by a so-called jammer installed on the vehicle which is a device designed to saturate a given area around, for instance, a military vehicle with electromagnetic energy in order to neutralize an object dangerous for the vehicle, for instance, a mine that is activated by a radio frequency signal for remote control. The high density electromagnetic field created by the jammer can generate disturbances both to electronic equipment on board of the vehicle and to the staff inside the vehicle.

These negative effects of the jammer are advantageously avoided by the electrical conductive layer or structure of the pane construction according to the invention since the conductive structure provides together with the body of the vehicle a closed Faraday cage protecting the passengers.

The bullet proof window of the invention may have a magnetic tape for mounting the pane construction on a gasket wherein the magnetic tape is fixed to a inside surface of the pane construction and/or to an outside surface of the gasket.

Preferably, the gasket is fixed on the pane construction by an adhesive, adhesive tape or layer.

The bullet proof window of the invention may comprise clamping means for holding the pane construction on the bullet proof window.

Further, the bullet proof window may have supporting means for supporting the pane construction on the ballistic block which are arranged within the gap between the ballistic block and the pane construction.

The bullet proof window of the invention can have at least one electrical conductive layer or structure arranged on the pane construction and electrically coupled to a frame and/or body of the vehicle.

The bullet proof window of the invention may have at least one mounting frame for mounting the pane construction and/ or gasket on the body of the vehicle, the bulletproof window, and/or the ballistic block.

The pane construction of the invention may comprise camouflage means. Accordingly, the invention offers the advantage to apply the pane construction with camouflage paint when a good camouflage effect is required, particularly during the day, and to remove the pane construction quickly when it is required for the driver or the crew to have the normal or improved sight through the bullet proof window, for instance, during night.

The camouflage means used in the invention may be camouflage markings which have many holes like a grit structure or many separated and independent small dots or which is opaque.

Preferably, the camouflage means comprise an outer layer showing the camouflage markings and deposited on an inner black layer to reduce optical reflections and to improve , therefore, the camouflage effect.

The protective pane construction of the invention may comprise a peripheral circumferential frame made of steel, ferromagnetic material, or ferrimagnetic material or magnetically conducting material to reduce the weight of the protective pane construction. The circumferential gasket of the invention then may be fixed to the ballistic block.

The protective pane construction may comprise a sealing lip for covering a gap between the pane construction and a protective frame to reduce maintenance work.

The magnetic gasket may have an empty chamber to improve its vibration characteristics.

Additional advantageous embodiments of the invention are mentioned in the dependent claims.

Figure 6:
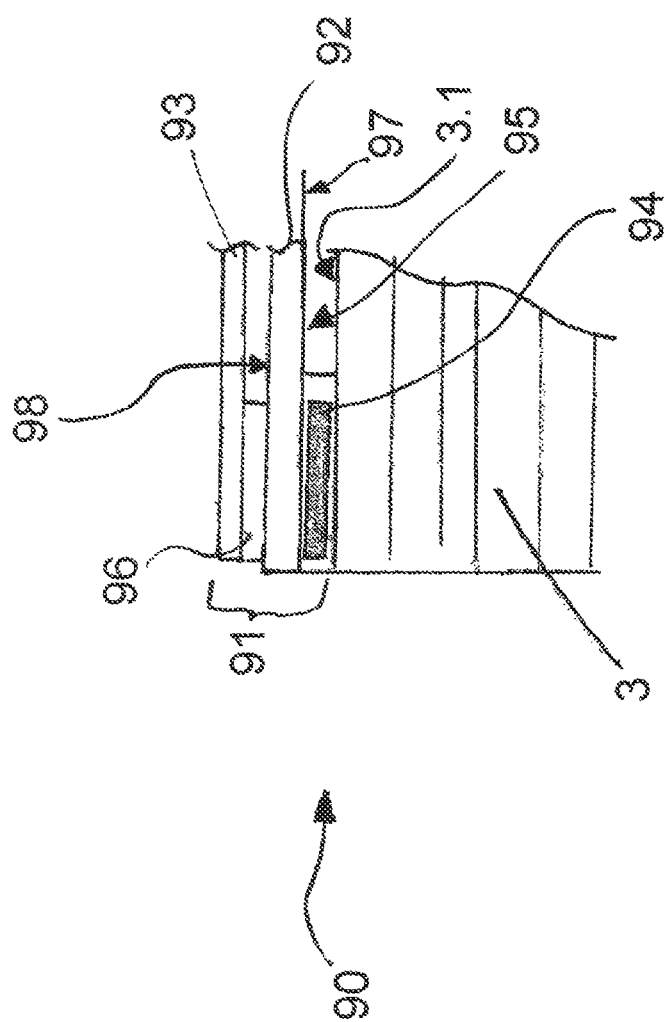
Figure 8:
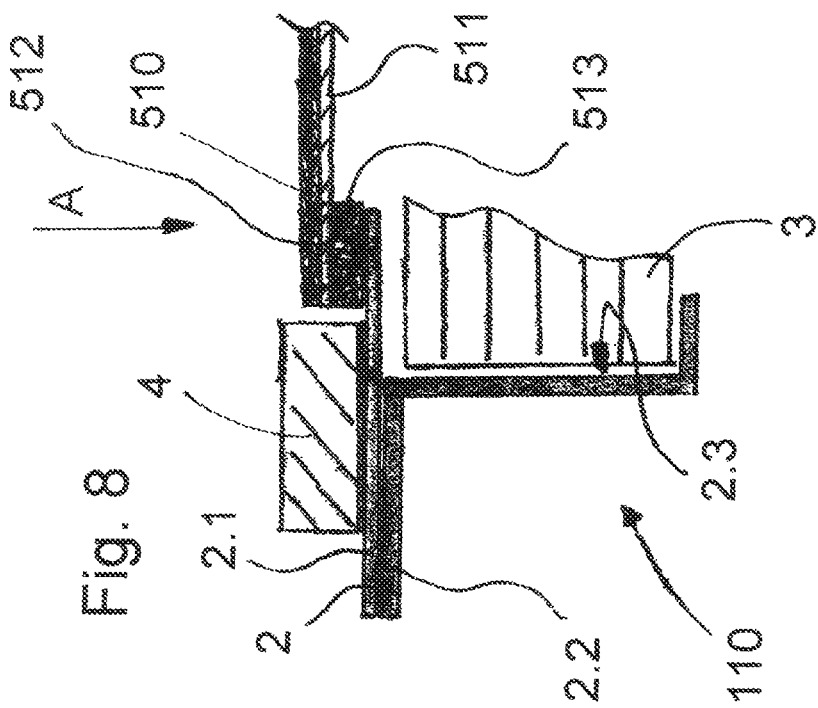
Figure 7:
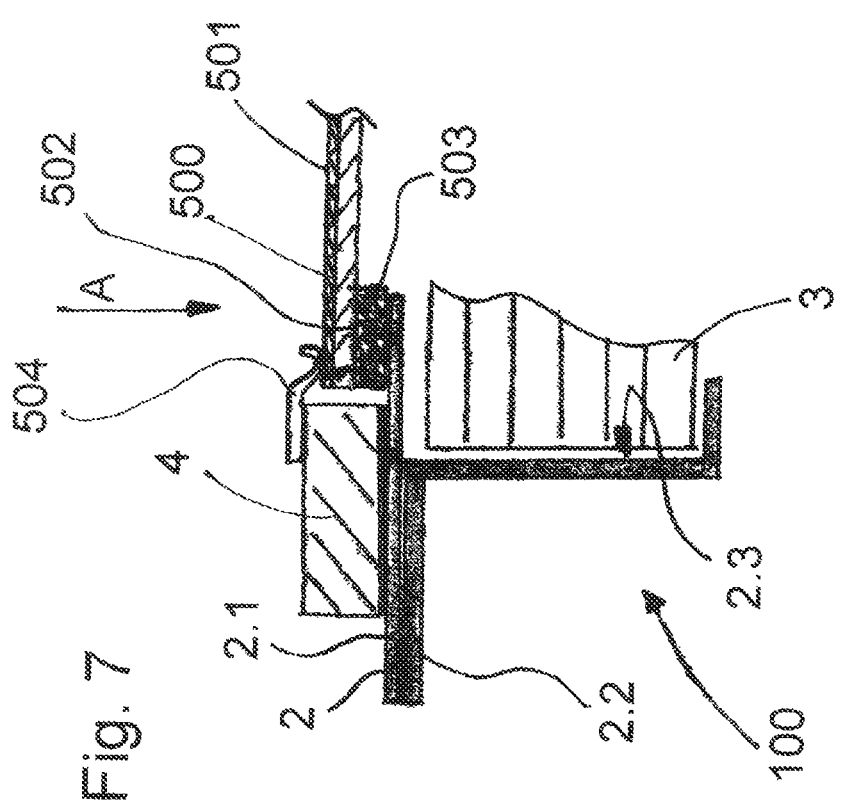
Figure 9:
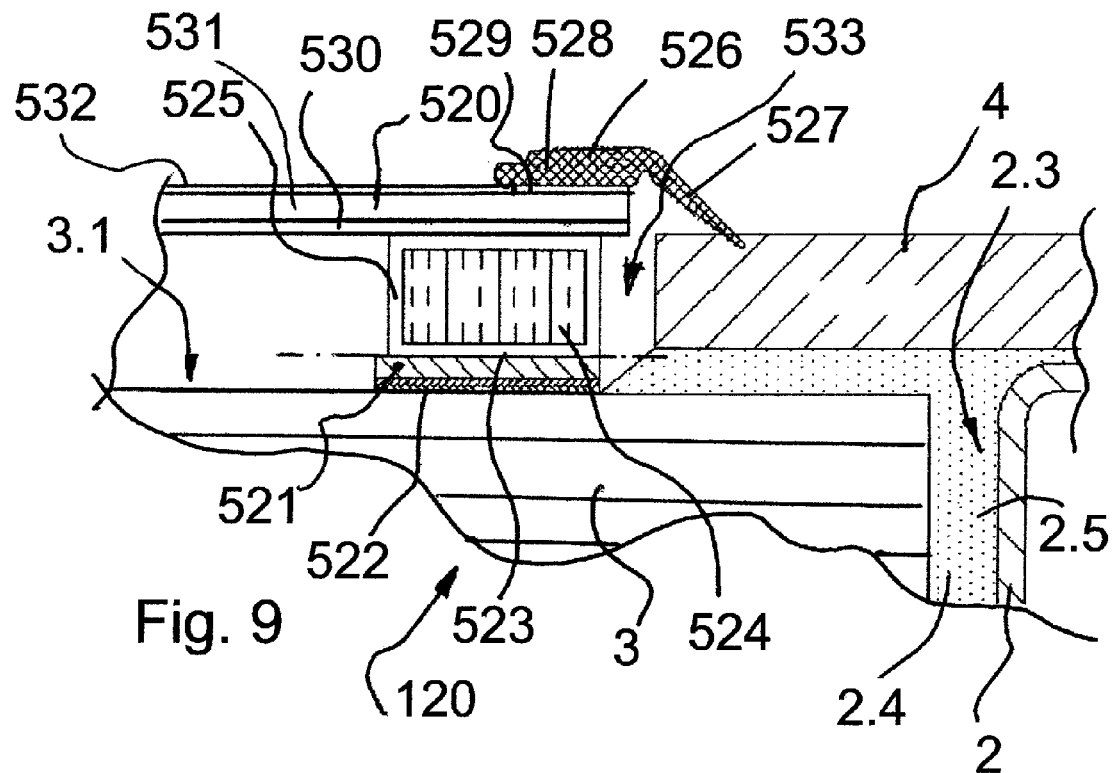
Figure 10:
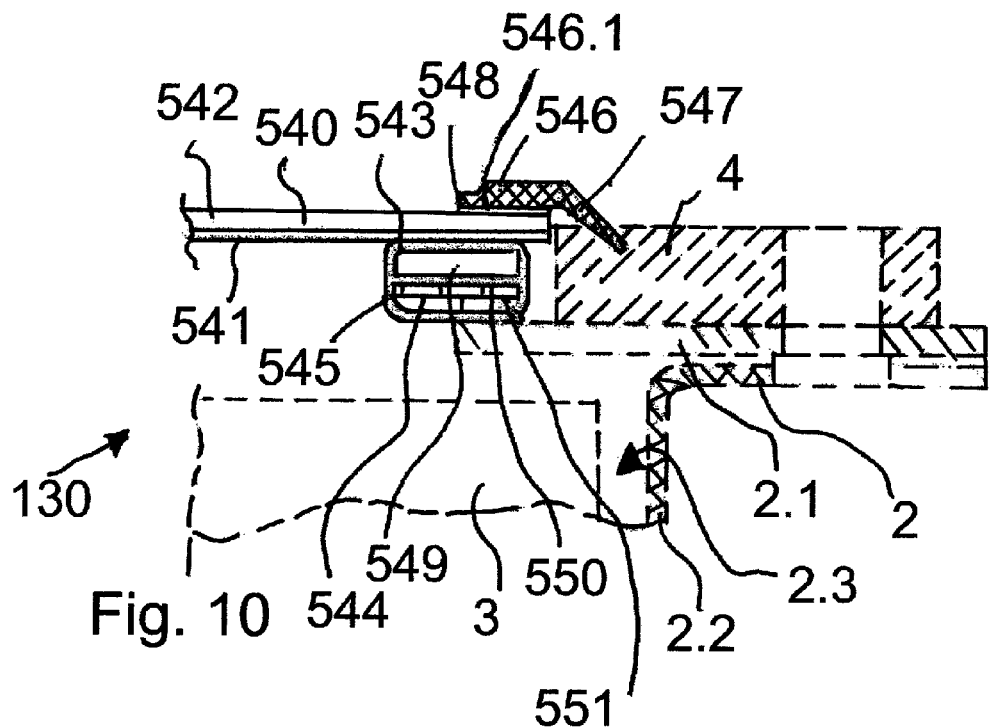
Figure 11:
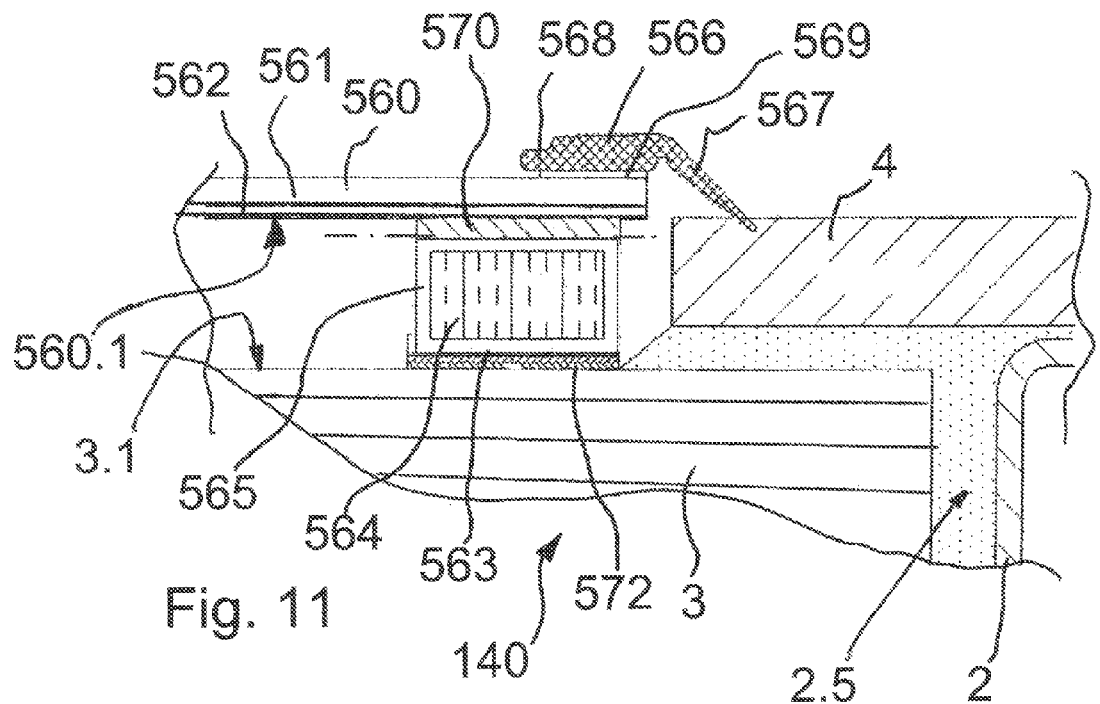
Figure 12:
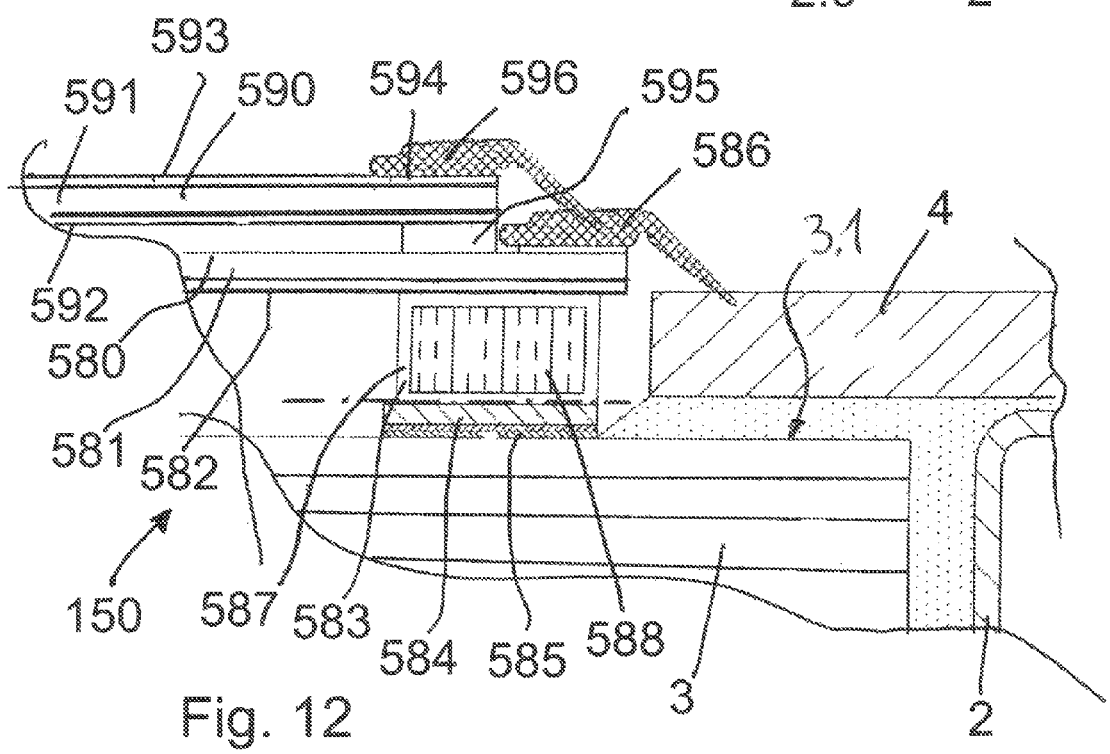

Further features, advantageous embodiments, and possible uses of the invention can be extracted from the following description of preferred and exemplary embodiments of the invention in connection with the drawings that show:

FIG. 1 a schematic and partial view in section of a pane construction of a preferred embodiment of the invention mounted on a frame holding a ballistic block of a bullet proof window according to the invention;

FIG. 2 a schematic and partial view in section of a further embodiment of the pane construction of the invention and the corresponding bullet proof window;

FIG. 3 a schematic and partial view in section of a third embodiment of the pane construction of the invention;

FIG. 4 a schematic and partial view in section of a fourth embodiment of the bullet proof window of the invention comprising a further embodiment of the pane construction using magnets;

FIG. 5 a schematic and partial view in section of a yet further embodiment of the bulletproof window of the invention comprising a mounting steel frame;

FIG. 6 a schematic and partial view in section of a further embodiment of the invention comprising a pane construction with a double structure;

FIG. 7 a schematic and partial view in section of a further pane construction of the invention with anti-jamming and mounted on a frame holding a ballistic block of a bullet proof window according to the invention; and FIG. 8 a schematic and partial view in section of a yet further pane construction of the invention with anti-jamming and mounted on a frame holding a ballistic block of a bullet proof window according to the invention;

FIG. 9 a schematic and partial view in section of a yet further pane construction mounted on a ballistic block of the bullet proof window according to the invention, comprising camouflage means;

FIG. 10 a schematic and partial view in section of a further embodiment of a protective pane construction of the invention, comprising a divided gasket;

FIG. 11 a schematic and partial view in section of an alternative protective pane construction of the invention, the magnetic gasket is fixed on the ballistic and a steel frame is fixed on the protective pane construction; and FIG. 12 a schematic and partial view of a further embodiment of the invention which comprises two different protective pane constructions mounted on each other on top of a ballistic block a bullet proof window according to the invention.

FIG. 1 shows a preferred embodiment of the invention which comprises a bullet proof window 1 that has a peripheral and circumferential frame 2 made of steel, an optically transparent ballistic block 3 that is hold in a circumferential groove 2.3 of the steel frame 2, a protecting frame 4, and a pane construction 5 for covering and protecting an outside surface 3.1 of the ballistic block 3.

More detailed, the transparent ballistic block 3 is a laminate consisting of an outer first glass ply 3.7, a second glass ply 3.6, a third glass ply 3.5, a fourth glass ply 3.4, a fifth glass ply 3.3, and an inner ply 3.2 made of polycarbonate (PC) in this sequence from the outside to the inside of the car. The arrow A shows the direction, for instance, of a bullet shot from outside on the bullet proof window 1 of a vehicle or, for instance, of a stone thrown at the window. The laminate of the ballistic block 3 comprises five interlayers 3.8 between each two plies 3.2-3.7, each of the interlayers 3.8 being made for instance of plastic material like polyvinylbutyral (PVB) or polyurethane (PU).

The steel frame 2 of the bullet proof window 1 corresponds to the circumferential shape of the bullet proof window 1 and it comprises a first flat and circumferential part 2.1 and a second circumferential part 2.2 which is angled to provide a groove 2.3 for receiving and holding an edge of the ballistic block 3.

The protecting frame 4, which is also made of ballistic steel, overlaps the edge of the ballistic block 3 and the frame 2 to protect the intermediate region between the edge of the ballistic block 3 and the steel frame 2 within the groove 2.3 in order to protect this intermediate region against bullets from the outside shot in direction A.

The pane construction 5 of the invention comprises a ply 5.1 made of, for instance, thermally toughened glass or polycarbonate (PC), and a peripheral and circumferential gasket 5.2 made of elastic rubber which is fixed to the ply 5.1 by an adhesive or adhesive layer 5.3. Again the gasket 5.2 is mounted on the free end of the longitudinal flat part 2.1 of the steel frame 2, for instance, by means of adhesive or magnetic force.

FIG. 2 shows a further embodiment of the invention comprising a bulletproof window 55, a steel frame 54, and an optically transparent pane construction 50 that has a protecting ply 51 and a peripheral and circumferential gasket 52 being magnetic and being fixed to the steel frame 54 of the bullet proof window 55 by the magnetic force created by the magnetic gasket 52. Again the pane construction 50 covers and protects the whole outside surface 3.1 of the ballistic block 3 of the bullet proof window 55. Supporting means 6 in the shape of individual dots or a stripe are provided in a gap 7 or space between the glass ply 51 and the outside surface 3.1 of the ballistic block 3 that is the same laminate as used in FIG. 1. The supporting means 6 or spacer is made of, for instance, plastic material or silicone and is fixed to the pane construction 50. It lies on the outside 3.1 of the ballistic block 3.

The pane construction 50 may be a laminate comprising several layers made of glass, plastic material, and/or ceramic material and respective interlayers there between made of plastic material like polyurethane (PU) or polyvinylbutyral (PVB) in order to provide an integrated laminate. For instance, the pane construction 50 may be laminate comprising the following layers from outside to inside:

glass ply—PVB/PU layer—acrylic ply; or
glass ply—PVB/PU layer—methacrylate—PVB/PU layer—glass ply; or
glass ply—PVB/PU layer—polycarbonate (PC) layer; or
glass ply—PVB/PU layer—PC layer—PVB/PU layer—glass ply; or
glass ply—PVB/PU layer—Sentry Glas Plus (SGP); or
glass ply—PVB/PU layer—SGP—PVB/PU layer—glass ply; or
glass ply—PVB/PU layer—spall-shield film; or
Gorilla glass ply—PVB/PU layer—glass ply; or
Gorilla glass—PVB/PU layer—glass ply—PVB/PU layer—Gorilla glass.

In alternative the pane construction 50 may comprise a monolithic thermally toughened glass or a a transparent plastic material such as methacrylate, plain or with protection hard-coating, polycarbonate (PC) plain or with protection hard-coating, or a combination of acrylic layer and PC layer.

FIG. 3 shows a partial view in section of a third embodiment of a pane construction 60 of the invention which comprises a ply 61 made of glass or polycarbonate or a laminate made of several layers made of glass, or plastic material like polycarbonate (PC), and a peripheral and circumferential gasket 62 comprising a coating 63 made of rubber which is filled with a ferromagnetic powder 64 in order to be able to create a magnetic force. In alternative the gasket 62 consists of a mixture made of rubber and ferromagnetic powder.

FIG. 4 shows a further embodiment of a bullet proof window 70 of the invention in a schematic partial view in section. The bulletproof window 70 comprises a ballistic block 3 like in FIG. 1, a steel frame 71 for holding the ballistic block 3, and a covering and protecting pane construction 72 mounted on the steel frame 71 providing a gap 73 between the ballistic block 3 and the pane construction 72.

The pane construction 72 comprises again a ply 74 made of glass and a gasket 75, which is fixed to the peripheral region of the glass ply 74. The gasket 75 comprises a coating 76 made of rubber and enclosing ferromagnetic means 77 like, for instance, a ferromagnetic frame or a sequence of ferromagnetic strips or magnets. The gasket 75 is fixed to the peripheral region of the glass ply 74 by adhesive or adhesive layer or an adhesive tape 78. Accordingly, the pane construction 72 is mounted on the steel frame 71 of the bullet proof window 70 by attracting magnetic force created by the magnetic means 77 in the gasket 75.

FIG. 5 shows a yet further embodiment of the invention comprising a bullet proof window 80 having a metal frame 81 connected to the body of the vehicle and a ballistic block 3 again constructed as in FIG. 1 as a laminate wherein the ballistic block 3 holds the metal frame 81 by means of adhesive 82 between the metal frame 81 and the face side 83 of the ballistic block 3. On the outside surface 3.1 of the ballistic block 3, a peripheral and circumferential additional mounting frame 84 is provided which is made of ferromagnetic metal and connected to the outside surface 3.1 of the ballistic block 3 by means of an adhesive layer 85.

Covering and protecting pane construction 86 comprises again a glass ply 87 or laminate and a gasket 88 that is magnetic and that is joined to the ferromagnetic frame 85 only by means of magnetic forces. Accordingly, the pane construction 86 can easily be removed by applying a mechanical removing force stronger than the attracting magnetic forces fixing the pane construction 86 to the mounting frame 84 and therefore also to the outside surface 3.1 of the ballistic block 3 of the bulletproof window 80.

FIG. 6 shows a further embodiment of the invention comprising a bullet proof window 90 that has a ballistic block 3 constructed like the ballistic block 3 of FIG. 1 where a peripheral circumferential frame 94, magnetic frame, magnets, and/or a metal frame is laminated between an external glass ply 92 and its lower side 97 and the surface 3.1. A pane construction 91 has a double structure.

The pane construction 91 comprises the first ply 92 and a second ply 93 wherein the first ply 92 is made of, for instance, glass and mounted on a peripheral circumferential frame 94, magnetic frame, magnets, or magnetic means fixed on the outside surface 3.1 of the ballistic block 3 and on the lower side 97 of the glass ply 92 by adhesive. Between the glass ply 92 and the lower side 97 of the glass ply 92 and the outside surface 3.1 of the ballistic block 3 there is a glass ply 95 or a gap having substantially the same thickness as the frame 94. The thickness of the frame 94 is compensated by the glass ply 95. On the upper side 98 of the glass ply 92, the second and outer ply 93 made for instance of glass or polycarbonate (PC) is mounted to the glass ply 92 only by magnetic forces created by a magnetic gasket 96 fixed on the second ply 93 by adhesive.

The magnetic gasket 96 comprises, for instance, ferromagnetic powder or magnets or is a mixture of rubber and ferromagnetic powder.

FIG. 7 shows a schematic and partial view in section of a further pane construction 500 of the invention with anti-jamming protection and mounted on a frame 2 holding a ballistic block 3 of a bullet proof window 100 according to the invention.

The bullet proof window 100 has the peripheral and circumferential steel frame 2, the optically transparent ballistic block 3 that is hold in a circumferential groove 2.3 of the steel frame 2, a protecting frame 4, and the pane construction 500 for covering and protecting an outside surface 3.1 of the ballistic block 3.

The transparent ballistic block 3 is a laminate comprising, for instance, the layers 3.2 to 3.7 and the interlayers 3.8 as shown in FIG. 1.

The steel frame 2 of the bullet proof window 1 corresponds to the circumferential shape of the bullet proof window 100 and it comprises a first flat and circumferential part 2.1 and a second circumferential part 2.2 which is angled to provide a groove 2.3 for receiving and holding an edge of the ballistic block 3. Frame 2 is directly connected to the body of a vehicle.

The protecting frame 4, which is also made of ballistic steel, overlaps the edge of the ballistic block 3 and the frame 2 to protect the intermediate region between the edge of the ballistic block 3 and the steel frame 2 within the groove 2.3 in order to protect this intermediate region against bullets from the outside shot in direction A.

The pane construction 500 of the invention has a laminate comprising a ply 502 made of, for instance, thermally toughened glass or polycarbonate (PC), and an anti-jamming layer 501 made of thin sputtered aluminum or metal grit for shielding of electromagnetic fields and being mounted on the lower ply 502. A peripheral and circumferential magnetic gasket 503 is fixed to the ply 502 by an adhesive or adhesive layer 5.3. The gasket 5.2 and consequently also the whole pane construction is mounted on the free end of the flat part 2.1 of the steel frame 2, for instance, by means of magnetic attraction.

Metal clamping means 504 or a clamp are provided to press the pane construction 500 on the frame 2. Further, since the clamping means are electrically conductive, the electrically conductive anti-jamming layer 501 is electrically coupled via the clamping means 504, the protecting frame 4, the part 2.1 of the frame 2 to the body of a vehicle or earth in order to provide a closed Faraday cage for protection against so-called jamming.

FIG. 8 shows a schematic and partial view in section of a yet further pane construction 510 of the invention with anti-jamming protection and mounted on a frame 2 holding a ballistic block 3 of a bullet proof window 110 according to the invention.

The bullet proof window 110 has the peripheral and circumferential steel frame 2, the optically transparent ballistic block 3 that is hold in a circumferential groove 2.3 of the steel frame 2, a protecting frame 4, and the pane construction 510 for covering and protecting an outside surface 3.1 of the ballistic block 3.

The transparent ballistic block 3 is a laminate comprising, for instance, the layers 3.2 to 3.7 and the interlayers 3.8 as shown in FIG. 1.

The steel frame 2 of the bullet proof window 1 corresponds to the circumferential shape of the bullet proof window 110 and it comprises a first flat and circumferential part 2.1 and a second circumferential part 2.2 which is angled to provide a groove 2.3 for receiving and holding an edge of the ballistic block 3. Frame 2 is directly connected to the body of a vehicle.

The protecting frame 4, which is also made of ballistic steel, overlaps the edge of the ballistic block 3 and the frame 2 to protect the intermediate region between the edge of the ballistic block 3 and the steel frame 2 within the groove 2.3 in order to protect this intermediate region against bullets from the outside shot in direction A.

The pane construction 510 of the invention has a laminate comprising an upper ply 512 made of, for instance, thermally toughened glass or polycarbonate (PC), and an lower anti-jamming layer 511 made of, for instance, thin sputtered aluminum or metal grit for shielding of electromagnetic fields and being mounted on the lower side of the upper ply 512. A peripheral and circumferential magnetic and electrically conductive gasket 513 is fixed to the lower side of the anti-jamming layer 511 by an adhesive or adhesive layer. The gasket 513 and consequently also the whole pane construction 510 is mounted on the free end of the flat part 2.1 of the steel frame 2, for instance, by means of magnetic attraction.

Further, since the gasket 513 is electrically conductive by means of electrically conductive powder of the gasket 513 or an electrically conductive structure of the gasket 513, the electrically conductive anti-jamming layer 511 is electrically coupled via the gasket 513 and the part 2.1 of the frame 2 to the body of a vehicle or earth in order to provide the closed Faraday cage for protection against jamming.

Generally, if required, to avoid humidity condensation in the air gap between the protective pane construction or screen and the surface of the ballistic block or glass, it is possible to use some drying agents like molecular saves or salt in the form of one or more capsules that can be replaced when they are saturated.

FIG. 9 shows a schematic and partial view in section of a yet further optically transparent pane construction 520 mounted on a ballistic block 3 of the bullet proof window 120 according to the invention.

The bullet proof window 120 has a peripheral and circumferential flat frame 521 or frame made of steel or another ferromagnetic or ferrimagnetic magnetically conducting material which is fixed by an adhesive layer 522 or glue on an outside surface 3.1 of the optical transparent ballistic block 3 being hold in a circumferential groove 2.3 of a receiving steel frame 2 or rabbet. A protecting frame 4 covers the gap 2.5 between the edge of the ballistic block 3 and the receiving steel frame 2 and it overlaps the edges of the ballistic block 3 and the receiving frame 2 if seen from outside. The spaces 2.4 between the protecting frame 4, the receiving frame 2, and the ballistic block 3 are filled with an adhesive or sealant, for instance, made of polyurethane. The transparent ballistic block 3 is a laminate comprising, for instance, the layers 3.2 to 3.7 and the interlayers 3.8 as shown in FIG. 1.

The protective pane construction 520 covers and protects the outside surface 3.1 of the ballistic block 3, for instance, against stones and similar objects impinging on or thrown to the window 120 from outside. Accordingly, the protective pain construction 520 offers, for instance, an anti stone protection.

The pane construction 520 of the invention can comprise, for instance, a laminate comprising an upper transparent ply or pane 531 made of, for instance, thermally toughened glass or polycarbonate (PC), and a lower optional interlayer 530 of, for instance, an adhesive layer or foil of polyurethane (PU) or similar material like PC. It may also comprise an anti-jamming layer made of a thin sputtered aluminum or metal grit for shielding of electromagnetic fields.

As shown in FIG. 9, the pane construction 520 may comprise camouflage means 532 arranged on the outside surface of the upper ply 531. The camouflage means 532 or camouflage markings are a painting to make the vehicle less recognizable from outside and it may have a layered structure comprising two or more layers of painting. For obtaining a good camouflage effect, the camouflage means 532 should preferably comprise the same pattern as used as camouflage on other parts of the vehicle. The painting of the camouflage means 532 has gaps to ensure sufficient and required sight for driving the vehicle if, for instance, the pane construction 520 covers and protects a windshield of the vehicle.

The camouflage means 532 may comprise many holes as gaps like a grit structure or it may be composed of many separated and independent small dots of paint which may each have a diameter of, for instance, ⅔ mm.

The camouflage means 532 may comprise two layers, an outer layer showing the camouflage paint and a black paint inner layer for reducing reflections which is below the outer layer and on the outer ply 531.

A peripheral and circumferential magnetic gasket 523 in the shape of a frame is fixed to the lower side of the interlayer 530 by an adhesive or adhesive layer. The gasket 523 has a housing 525 made of rubber in the shape of a rectangular frame if seen in section. The inside of the housing 525 contains a permanent magnet 524 or magnetic material.

Further, the pane construction 520 comprises a peripheral circumferential integral lip seal 526 with a basic part 528 fixed to the outside surface of the upper ply 531 by means of an adhesive layer 529 or gluing, and an oblique part 527 covering a gap 533 between the protecting frame 4 made of ballistic steel and the pane construction 520 to avoid water and dirt there between.

The protective pane construction 520 is fixed or mounted on the frame 521 of the ballistic block 3 by means of the attractive magnetic forces between the magnetic gasket 523 of the protective pane construction 520 and the steel frame 521, and, therefore, it can easily be removed and exchanged if it is damaged by an impinging object like a stone.

FIG. 10 shows a schematic and partial view in section of a yet further embodiment of a protective optically transparent pane construction 540 of the invention mounted on an optically transparent ballistic block 3 of a bullet proof window 130 according to the invention.

The bullet proof window 130 provides a peripheral and circumferential frame 2 made of steel wherein the ballistic block 3 is hold in a circumferential groove 2.3 of the steel frame 2. The ballistic block 3 can have the same laminate or layers as the ballistic block 3 of FIG. 1.

The steel frame 2 of the bullet proof window 130 corresponds to the circumferential shape of the bullet proof window 1 and it comprises a first flat and circumferential part 2.1 and a second circumferential part 2.2 which is angled to provide the groove 2.3 for receiving and holding an edge of the ballistic block 3.

A protecting frame 4 which is also made of ballistic steel, overlaps the edge of the ballistic block 3 and the frame 2 to protect the intermediate region between the edge of the ballistic block 3 and the steel frame 2 within the groove 2.3 in order to protect this intermediate region against bullets from the outside.

The protective pane construction 540 of the invention comprises an outer ply 542 made of, for instance, thermally toughened glass or polycarbonate (PC), a further optional ply 541 or interlayer adjoining the outer ply 542 and being made, for instance, of PU or PC, and a peripheral and circumferential gasket 543.

The gasket 543 comprises a housing 545 and a permanent magnet 544 with a plurality of layered magnets. The housing 545 of the gasket 543 is made of elastic rubber and is divided by a separating wall 550 into an upper empty chamber 549 being near the lower ply 541 and a lower chamber 551 containing the permanent magnet 544. The housing 545 of the gasket 543 is fixed to the lower ply 541 by an adhesive, for instance, PET or epoxy resin adhesive or adhesive layer. Again the gasket 543 is mounted on the free end of the longitudinal flat part 2.1 of the steel frame 2, for instance, by means of magnetic attraction force between the permanent magnet 544 and the magnetic conductive part 2.1 of the steel frame 2. Due to the empty upper chamber 549, the gasket 543 provides good damping characteristics in the case of vibrations.

Further, the protective pane construction 540 comprises a peripheral circumferential integral lip seal 546 with a basic part 548 fixed to the outside surface of the upper ply 542 by means of an adhesive layer 546.1 or gluing made, for instance, of epoxy resin, and a oblique part 547 covering a gap between the protecting frame 4 made of ballistic steel and the pane construction 540 to avoid water and dirt there between.

FIG. 11 shows a schematic and partial view in section of an alternative protective optically transparent pane construction 560 mounted on a ballistic block 3 of a bullet proof window 140 according to the invention.

The protective pane construction 560 comprises a peripheral and circumferential flat frame 570 or frame made of steel or another ferromagnetic or ferrimagnetic magnetically conducting material which is fixed by an adhesive layer made, for instance, of epoxy resin or glue on an inside surface 560.1 of the pane construction 560.

An optical transparent ballistic block 3 is supported in a receiving steel frame 2 or rabbet. A protecting frame 4 covers the gap 2.5 between the edge of the ballistic block 3 and the receiving steel frame 2 and it overlaps the edges of the ballistic block 3 and the receiving frame 2 if seen from outside. The transparent ballistic block 3 is a laminate comprising, for instance, the layers 3.2 to 3.7 and the interlayers 3.8 as shown in FIG. 1.

The protective pane construction 560 covers and protects the outside surface 3.1 of the ballistic block 3, for instance, against stones and similar objects impinging on or thrown to the window 140 from outside. Accordingly, the protective pain construction 560 offers, for instance, an anti stone protection.

The pane construction 560 of the invention can comprise, for instance, a laminate comprising an upper ply or pane 561 made of, for instance, thermally toughened glass or polycarbonate (PC), and optionally a lower interlayer 562 of, for instance, an adhesive layer or foil of polyurethane (PU) or PC or similar material.

A peripheral and circumferential magnetic gasket 563 in the shape of a frame is fixed to the upper surface 3.1 of the ballistic block 3 by means of an adhesive layer 572, made for instance, of epoxy resin. The gasket 563 has a housing 565 made of rubber in the shape of a rectangular frame if seen in section. The housing 565 contains a permanent magnet 564 or magnetic material.

Further, the pane construction 560 comprises a peripheral circumferential integral lip seal 566 with a basic part 568 fixed to the outside surface of the upper ply 561 by means of an adhesive layer 569 of, for instance, epoxy resin, or gluing, and an oblique part 567 covering a gap between the protecting frame 4 made of ballistic steel and the pane construction 560 to avoid water and dirt there between.

Again, the protective pane construction 560 is fixed or mounted on the gasket 563 of the ballistic block 3 by means of the attractive magnetic forces between the magnetic gasket 563 and the steel frame 570 adjoining the gasket 563, and, therefore, the protective pane construction 560 can be removed and exchanged easily if it is damaged by an impinging object like a stone.

FIG. 12 shows a schematic and partial view of a further embodiment of the invention which comprises two different protective pane constructions 580 and 590 mounted on a ballistic block 3 of a bullet proof window 150 according to the invention.

The bullet proof window 150 has a peripheral and circumferential flat frame 584 or frame made of steel or another ferromagnetic or ferrimagnetic magnetically conducting material which is fixed by an adhesive layer 585 or glue, for instance, epoxy resin, on an outside surface 3.1 of the optical transparent ballistic block 3 being hold in a receiving steel frame 2 or rabbet. A protecting frame 4 covers a gap between the edge of the ballistic block 3 and the receiving steel frame 2 and it overlaps the edges of the ballistic block 3 and the receiving frame 2 if seen from outside. The spaces between the protecting frame 4, the receiving frame 2 and the ballistic block 3 are filled with an adhesive or sealant, for instance, made of polyurethane. The transparent ballistic block 3 is a laminate comprising, for instance, the layers 3.2 to 3.7 and the interlayers 3.8 as shown in FIG. 1.

Generally, the protective pane construction 580 covers and protects the outside surface 3.1 of the ballistic block 3, for instance, against stones and similar objects impinging on or thrown to the window 150 from outside. The pane construction 580 of the invention can comprise, for instance, an optical transparent laminate with an upper ply or pane 581 made of, for instance, thermally toughened glass or polycarbonate (PC), and a lower optional interlayer 582 of, for instance, an adhesive layer or foil of polyurethane (PU) or similar material like PC. It may also comprise an anti-jamming layer made of a thin sputtered aluminum or metal grit for shielding of electromagnetic fields.

A peripheral and circumferential magnetic gasket 583 in the shape of a frame is fixed to the lower side of the interlayer 582 of the protective pane construction 580 by an adhesive or adhesive layer, for instance, epoxy resin. The gasket 583 has a housing 587 made of rubber in the shape of a rectangular frame if seen in section. The housing 587 contains a permanent magnet 588 or magnetic material.

Further, the pane construction 580 comprises a peripheral circumferential integral lip seal 586 covering a gap between protecting frame 4 made of ballistic steel and pane construction 580 to avoid water and dirt there between.

The protective pane construction 580 is fixed or mounted on the steel frame 584 of the ballistic block 3 by means of the attractive magnetic forces between the magnetic gasket 583 of the protective pane construction 580 and the steel frame 584.

A further protective outer pane construction 590 is arranged on top of the protective inner pane construction 580. The pane construction 590 can comprise, for instance, an optical transparent laminate with a ply or pane 591 made of, for instance, thermally toughened glass or polycarbonate (PC), and a lower optional interlayer 592 of, for instance, an adhesive layer or foil of polyurethane (PU) or similar material.

As shown in FIG. 12, the further pane construction 590 comprises camouflage means 593 arranged on the outside surface of its ply 591. The camouflage means 593 or camouflage markings correspond to a painting to make the vehicle less recognizable from outside and it may have a layered structure comprising two or more layers of paint.

The camouflage means 593 or camouflage layer may comprise many holes like in a grit structure or it may be composed of many separated and independent small dots of paint which may each have a diameter of, for instance, ⅔ mm. The camouflage means 593 may comprise two layers, an outer layer showing the camouflage paint and a black paint inner layer for reducing reflections which is below the outer layer and on the outer ply 591.

Further, the pane construction 580 comprises a peripheral circumferential integral lip seal 586 covering a gap between protecting frame 4 made of ballistic steel and pane construction 580 to avoid water and dirt there between.

The protective pane construction 590 comprises a peripheral and circumferential steel frame 595 fixed to a lower surface surface of the lower ply 592 and touching the outer surface of the outer ply 581 of the pane construction 580. The outer protective pane construction 590 is mounted on top of the inner pane construction 580 by means of the attractive magnetic forces between the magnetic gasket 583 of the protective pane construction 580 and the steel frame 595 of the outer pane construction 590.

The pane construction 590 may comprise a peripheral circumferential integral lip seal 596 covering a gap between the edge of the pane construction 590 and the lip seal 586 of the pane construction 580.

In case the driver of a vehicle needs a better sight through the bullet proof window 150, for instance, in the night, the driver of the vehicle can easily remove the outer protective pane construction 590 comprising the camouflage layer 593 to improve his sight through the window during driving.

The Invention claimed is:

1. A bullet proof window for a motor vehicle, said bullet proof window comprising:
    a ballistic block having transparent panes and layers made of glass, ceramic, or plastic, said transparent panes and layers arranged in a layered manner in a laminate, and said ballistic block having an outside surface;
    at least one transparent pane construction protecting and covering completely or at least a part of the outside surface of the ballistic block, wherein said pane construction is removable and exchangeable independently of the ballistic block; and
    a magnetic gasket configured to mount the pane construction on at least one selected from the group consisting of the ballistic block,
a frame mounting the ballistic block on a body of the motor vehicle,
the body of the motor vehicle, and
a mounting frame arranged on the outside surface of the ballistic block,
wherein the magnetic gasket is arranged between (i) the pane construction and (ii) the at least one selected from the group consisting of
the ballistic block,
the frame mounting the ballistic block on the body of the motor vehicle,
the body of the motor vehicle, and
the mounting frame arranged on the outside surface of the ballistic block.

2. The bullet proof window according to claim 1, wherein the at least one pane construction is arranged with a gap between the outside surface of the ballistic block and the pane construction.

3. The bullet proof window according to claim 1, wherein the at least one pane construction is arranged without a gap between the outside surface of the ballistic block and the pane construction.

4. The bullet proof window according to claim 1, further comprising:
at least one electrical conductive layer or structure arranged on the pane construction and configured to be electrically coupled to at least one of a frame or the body of the motor vehicle.

5. The bullet proof window according to claim 1, wherein the pane construction comprises a camouflage feature.

6. The bullet proof window according to claim 5, wherein the camouflage feature includes camouflage markings,
the camouflage markings have a plurality of holes in a grit structure or a plurality of separated and independent dots, or
the camouflage markings are opaque.

7. The bullet proof window according to claim 5, wherein the camouflage feature comprises:
an inner black layer, and
an outer layer showing camouflage markings and deposited on the inner black layer.

8. The bullet proof window according to claim 1,
wherein the pane construction further comprises a peripheral circumferential frame made of steel, ferromagnetic material, ferrimagnetic material, magnetically conductive material, or a magnetic tape arranged on an inside surface of the pane construction,
wherein the magnetic gasket is fixed on the ballistic block.

9. The bullet proof window according to claim 1,
wherein the magnetic gasket is a circumferential magnetic gasket fixed, by an adhesive or an adhesive tape or an adhesive layer, to at least one of
the ballistic block,
the frame mounting the ballistic block on the body of the motor vehicle,
the body of the motor vehicle, and
the mounting frame arranged on the outside surface of the ballistic block.

10. The bullet proof window according to claim 1, wherein the pane construction comprises a sealing lip for covering a gap between the pane construction and a protective frame.

11. The bullet proof window according to claim 1, wherein the magnetic gasket has an empty chamber.

12. The bullet proof window according to claim 1, wherein the pane construction comprises a pane, wherein the magnetic gasket is fixed on the pane by an adhesive, an adhesive tape or an adhesive layer.

13. The bullet proof window according to claim 1, wherein the magnetic gasket is electrically conductive.

14. The bullet proof window according to claim 1, wherein the magnetic gasket comprises magnetic powder.

15. The bullet proof window according to claim 1, wherein the magnetic gasket comprises:
magnets or a magnetic strip in or on the magnetic gasket, or
a magnetic tape arranged on an outside of the magnetic gasket.

16. The bullet proof window according to claim 1, further comprising:
a support for supporting the pane construction on the ballistic block.

17. The bullet proof window according to claim 1, wherein the pane construction further comprises at least one transparent electrically conductive layer or structure.

18. The bullet proof window according to claim 1, wherein the pane construction comprises one or more layers or plies made of glass, ceramic, or plastic material, wherein the one or more layers or plies are connected in a layered manner to each other in a laminate.

19. The bullet proof window according to claim 1, wherein the pane construction comprises at least one transparent layer made of Gorilla glass, polycarbonate (PC), glass, acryl glass, methacrylate, plastic, Sentry glass plus, or spall shield film.

20. The bullet proof window according to claim 1, wherein the pane construction is a transparent laminate comprising
an outer layer made of glass or Gorilla glass,
an inner layer made of glass, or Gorilla glass, and
an intermediate layer between the inner and outer layers and made of Sentry glass (SPG), polyvinylbutyral (PVB), polyurethane (PU), polycarbonate (PC), spall-shield film, or methacrylate.

21. The bullet proof window according to claim 1, further comprising:
at least one mounting frame or ferromagnetic frame for mounting at least one of the pane construction or the magnetic gasket on the body of the motor vehicle, the bullet proof window, or the ballistic block.

22. The bullet proof window according to claim 1, wherein the magnetic gasket comprises:
a magnetic material, and
an elastic body containing or housing the magnetic material.

23. The bullet proof window according to claim 22, wherein the elastic body comprises rubber.

24. A bullet proof window for a motor vehicle, said bullet proof window comprising:
a ballistic block having transparent panes and layers made of glass, ceramic, or plastic, said transparent panes and layers arranged in a layered manner in a laminate, and said ballistic block having an outside surface;
at least one transparent pane construction protecting and covering completely or at least a part of the outside surface of the ballistic block, wherein said pane construction is removable and exchangeable independently of the ballistic block;
a first magnetic tape; and
a magnetic gasket configured to mount the pane construction on the outside surface of the ballistic block,
wherein
the first magnetic tape is fixed on an inside surface of the pane construction, the magnetic gasket is fixed on the outside surface of the ballistic block, and the magnetic gasket is arranged between the first magnetic tape of the pane construction and the outside surface of the ballistic block, or the first magnetic tape is fixed on the outside surface of the ballistic block, the magnetic gasket is fixed on the inside surface of the pane construction, and the magnetic gasket is arranged between the pane construction and the first magnetic tape on the outside surface of the ballistic block.

25. A bullet proof window for a motor vehicle according to claim 24, wherein the first magnetic tape is fixed on the inside surface of the pane construction, the magnetic gasket is fixed on the outside surface of the ballistic block, and the magnetic gasket is arranged between the first magnetic tape on the inside surface of the pane construction and the outside surface of the ballistic block.

26. A bullet proof window for a motor vehicle according to claim 25, wherein the magnetic gasket comprises a first magnetic tape.

27. A bullet proof window for a motor vehicle according to claim 24, wherein the first magnetic tape is fixed on the outside surface of the ballistic block, the magnetic gasket is fixed on the inside surface of the pane construction, and the magnetic gasket is arranged between the pane construction and the first magnetic tape on the outside surface of the ballistic block.

28. A bullet proof window for a motor vehicle according to claim 27, wherein the magnetic gasket comprises a second magnetic tape.

29. A bullet proof window for a motor vehicle, said bullet proof window comprising:

a ballistic block having transparent panes and layers made of glass, ceramic, or plastic, said transparent panes and layers arranged in a layered manner in a laminate, and said ballistic block having an outside surface;

at least one transparent pane construction protecting and covering completely or at least a part of the outside surface of the ballistic block, wherein said pane construction is removable and exchangeable independently of the ballistic block;

a mounting frame made of ferromagnetic metal; and a magnetic gasket configured to mount the pane construction on the outside surface of the ballistic block, wherein the mounting frame made of ferromagnetic metal is fixed on the outside surface of the ballistic block, the magnetic gasket is fixed on an inside surface of the pane construction, and the magnetic gasket is arranged between the pane construction and the mounting frame on the outside surface of the ballistic block, or the mounting frame made of ferromagnetic metal is fixed on the inside surface of the pane construction, the magnetic gasket is fixed on the outside surface of the ballistic block, and the magnetic gasket is arranged between the mounting frame of the pane construction and the outside surface of the ballistic block.

30. A bullet proof window for a motor vehicle according to claim 29, wherein the mounting frame made of ferromagnetic metal is fixed on the outside surface of the ballistic block, the magnetic gasket is fixed on the inside surface of the pane construction, and the magnetic gasket is arranged between the pane construction and the mounting frame on the outside surface of the ballistic block.

31. A bullet proof window for a motor vehicle according to claim 29, wherein the mounting frame made of ferromagnetic metal is fixed on the inside surface of the pane construction, the magnetic gasket is fixed on the outside surface of the ballistic block, and the magnetic gasket is arranged between the mounting frame of the pane construction and the outside surface of the ballistic block.

32. A bullet proof window for a motor vehicle, said bullet proof window comprising:

a ballistic block having transparent panes and layers made of glass, ceramic, or plastic, said transparent panes and layers arranged in a layered manner in a laminate, and said ballistic block having an outside surface;

at least one transparent pane construction protecting and covering completely or at least a part of the outside surface of the ballistic block, wherein said pane construction is removable and exchangeable independently of the ballistic block; and a magnetic gasket fixed on an inside surface of the pane construction and configured to mount the pane construction on a steel frame of the body of the vehicle, wherein the magnetic gasket is arranged between the pane construction and the steel frame on an outside of the vehicle body.

* * * * *